Jan. 12, 1971  C. G. BROWN ET AL  3,555,529
APPARATUS FOR MEASURING ELECTRIC FIELD
RADIATION FROM LIVING BODIES
Filed Aug. 16, 1967  4 Sheets-Sheet 1
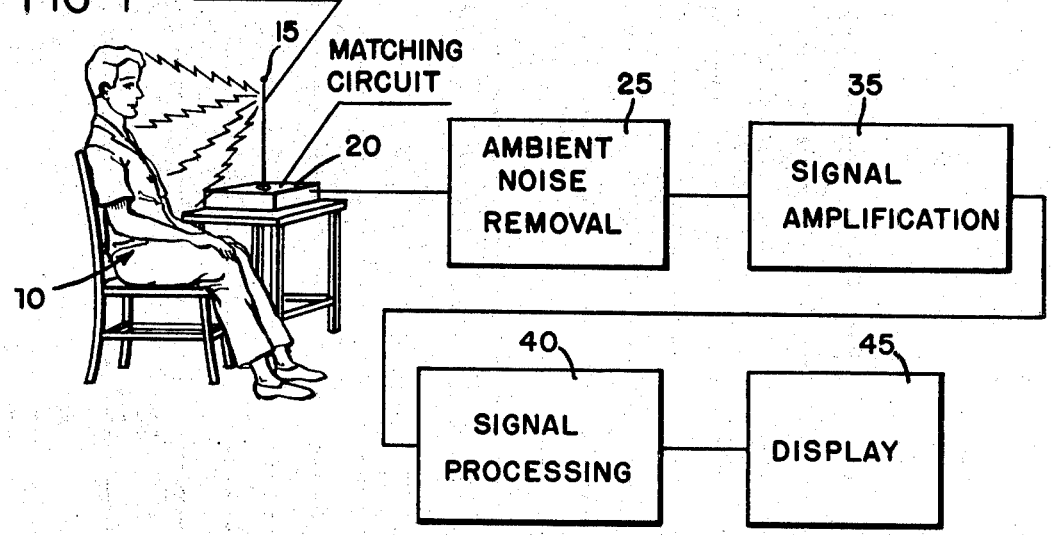
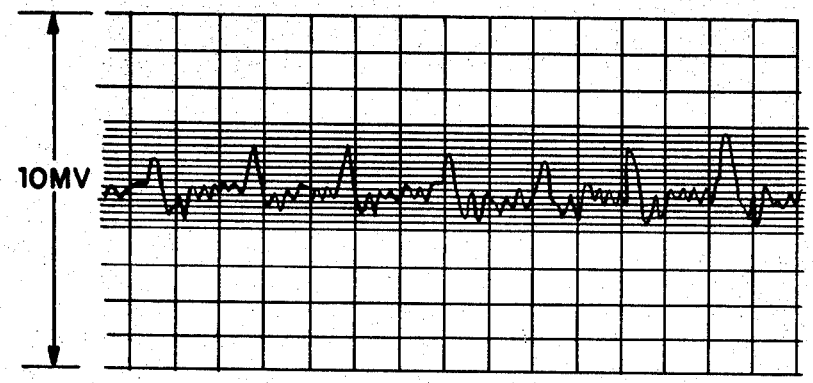
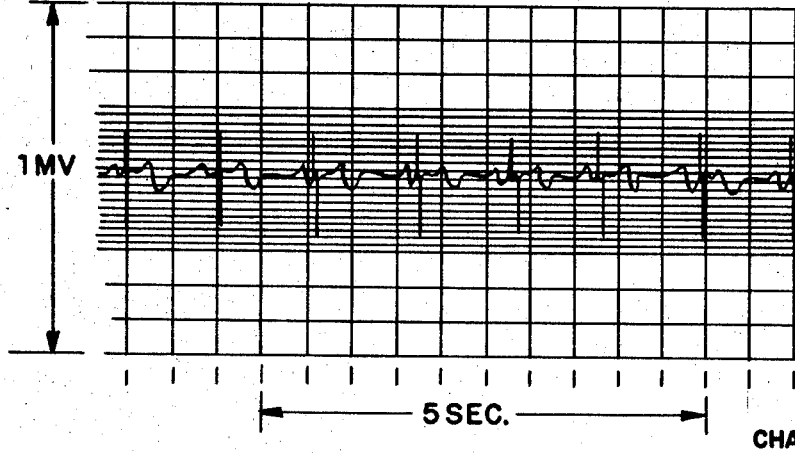
INVENTORS
CHARLES G. BROWN,
LEO THOMAS RAUTERKUS &
CHARLES E. WALKER
BY
Marechal, Biebel, French & Bugg
ATTORNEYS

United States Patent Office 3,555,529
Patented Jan. 12, 1971

3,555,529
APPARATUS FOR MEASURING ELECTRIC FIELD RADIATION FROM LIVING BODIES
Charles G. Brown and Leo Thomas Rauterkus, Dayton, and Charles E. Walker, Mason, Ohio, assignors to Systems Research Laboratories, Inc., Dayton, Ohio, a corporation of Ohio
Filed Aug. 16, 1967, Ser. No. 660,991
Int. Cl. G08b 1/08
U.S. Cl. 340—189                    5 Claims

ABSTRACT OF THE DISCLOSURE

An antenna, electrically short in comparison to a wavelength to be received, is positioned in close proximity to a living body to receive the electric energy radiated therefrom in the frequency range of from 0 to 3 kHz. An impedance matching device is connected directly to the antenna to convert the received energy into electrical signals for processing. The ambient noise components are removed from these electrical signals, either by physically shielding the body undergoing test and the antenna, by employing a second similar antenna to receive the ambient noise but not the signal radiated from the body undergoing test and electrically combining the signals from both said antennas to eliminate the ambient noise components, or by employing a tuned filter, for those ambient noise components having a periodic waveform. The resultant electrical signals are amplified and processed to distinguish among the various signals radiated due to the bioelectric activity of the living body.

BACKGROUND OF THE INVENTION

It has been known that functioning muscles and nerves naturally generate electricity and that such activity within a living body could be monitored by attaching electrodes to the body's surface. Examples of monitoring devices which have been developed to monitor this internal activity include the electrocardiogram (EKG) which records heart activity; the electroencephalogram (EEG) which monitors brain activity; the electromyogram (EMG) which monitors muscle activity. Other devices have been developed to monitor other body functions such as respiration rate and skin resistance.

The electrical activity of a living body may be observed on the surface of the body as a time varying potential due to electrical conduction from the source of the signal, such as the heart muscle action voltages. Other body functions, such as respiration rate, which may not be represented by internal electrical activity, may be transduced into useful signals monitoring the impedance changes of the body's surface by a birdge circuit or other similar impedance measuring device.

It is a known fact that the body has a static potential (DC level) with respect to ground. The normal measurement mode for attached electrodes measuring internal electrical activity is to attach one or more electrodes to the body using another attached electrode as the reference point. Using this measurement mode the DC level effects are canceled and do not play a part in the measurements. However, since a living body carries this static potential, any physical movement of the body will also produce an electric field. Thus, radiated electric fields will be produced as a result of either (1) the time varying electrical potentials on the body surface with respect to ground due to internal electrical activity, or (2) the physical movement of a body having a static potential level, such as lung motion during respiration.

Most prior art devices for measuring the electrical activity of a living body require physical contact with the body in order to obtain useful electrical signals which may be analyzed and correlated to specific body functions. Such physical contact inherently limits the freedom of movement of the body and the possibility exists that the contacts may become loose with the result that the resistance between the body and the monitoring equipment may vary giving in complete or erroneous signal outputs. Other prior art devices measure the magnetic field produced as a result of the electrical activity within a living body; however, the magnetic fields in the low frequency range under consideration are extremely weak and their detection requires rather extensive laboratory equipment which precludes the use of this technique in most practical environments.

BRIEF SUMMARY OF THE INVENTION

This invention relates to an apparatus for monitoring the electrical activity of a living body for monitoring the radiated electric field produced by said body without requiring contact therewith.

It has been observed that the radiated electric field produced by a living body has its energy concentrated at low frequencies, that is in the range of from 0 to 3 kHz. It has also been found that these low frequency electric fields may be detected by using an antenna which is electrically short relative to the wavelength of the radiated signals. For practical purposes, an antenna having a length in the order of one meter or less has been found useful. Since the antenna is electrically short, it follows that it will have a very high impedance, in the order of $10^{10}$ ohms or greater. A matching circuit is employed to convert the signal received by the antenna into useful electrical signals which may then be filtered and amplified. This matching circuit is preferably located physically adjacent to the antenna; and, accordingly, in order to provided portability to the antenna system, the matching amplifier is preferably battery powered, small in size, and constructed from solid state components. The output impedance of the amplier should be low so that relatively long lengths of cables may be used to interconnect the matching circuit with the electronic processing equipment.

Ambient noise components received by the antenna are preferably removed prior to amplification where such ambient noise components are of large magnitudes and could easily overdrive the sensitive amplifier stages. Such ambient noise is primarily caused by the electric fields generated by power lines in proximity to the measuring equipment. Three methods of ambient noise removal have been successfully employed, such methods including the physical screening of an environment in which the living body and the sensing antenna are placed, the use of differential antennas, one antenna being used to sense both the emitted radiation from the body and the ambient noise and a second antenna which receives only the ambient noise itself, and the filtering of ambient noise provided such noise has a periodic waveform.

After the ambient noise is removed from the system, the signal is amplied and processed. Since the signals radiated from the body are of relatively low frequencies, amplifiers with good low frequency response and low noise figures are required and used.

Signal processing may be accomplished by a number of methods, two of which are preferred. Frequency domain processing utilizes a bank of a narrow band pass filters, the outputs of which are sensitive only to signals falling within relatively narrow frequency ranges. Time domain processing is accomplished by correlating the signal received by the antenna with a reference signal. In some cases the reference signal may be obtained from electrodes attached to the body or from a function generator. Such processing equipment is well known in the art and will not be discussed in detail in this application.

Since no contact is required with the body undergoing observation, it is apparent that long term monitoring may be accomplished without irritation to the body which sometimes result from the physical contact of an electrode. Furthermore, there is no loosening of the electrode contact with age or with movement, and no restriction on the normal movements of the body. When monitoring a human being, the non-contacting feature of this invention eliminates any anxiety or stress which may develop when physical electrode contacts are used and therefore the readings obtained from this invention are typical of the actual conditions within the body. In fact, the subjects need not be aware that the electric fields created by their body functions are being monitored.

The monitoring equipment may be quickly installed or positioned by relatively unskilled technicians. Since only a single rather than a plurality of leads are required to connect the signal-receiving equipment with the analyzing equipment, the electric field sensing device may be positioned freely.

One special use of this device is in hospitals, and especially in the intensive care wards, premature baby wards, or burn patient wards where physical contact of the body would be either inconvenient or undesirable. Another use would be in monitoring the condition of astronauts during space missions. The non-contacting, signal-receiving device may also be employed in animal research.

A doctor may include one of these devices in his office as a diagnostic aid for obtaining information about a patient at intervals that would span a long time period. This invention may also be used in the mass screening of people for heart ailments where only the presence of the person and not actual contact is required.

Accordingly, it is an object of this invention to provide an apparatus for monitoring, without contact, the electric fields radiated from a living body as a result of the total bio-electric activity of that body including the physical movement of the body and time varying change in electrical potential on the surface of the body resulting from internal electrical activity; and to provide a method and apparatus for sensing the radiated signals of a living body, eliminating the ambient noise components from those signals, amplifying and then processing those signals to indicate one or more of the body functions which make up the total bioelectric radiated signal.

BRIEF DESCRIPTION OF THE DRAWINGS

FIG. 1 is a simplified block diagram of this invention;

FIG. 5 is an electrical schematic diagram showing another embodiment of a matching circuit and a bucking filter for rejecting power line interference signals;

FIG. 6a is a chart showing an output from this invention illustrating a heart beat; and FIG. 6b is a chart showing the output of an EKG operating simultaneously with this invention to show the relationship between signals received by the EKG and by the non-contacting method of this invention.

DETAILED DESCRIPTION OF THE DRAWINGS

Figure 2:
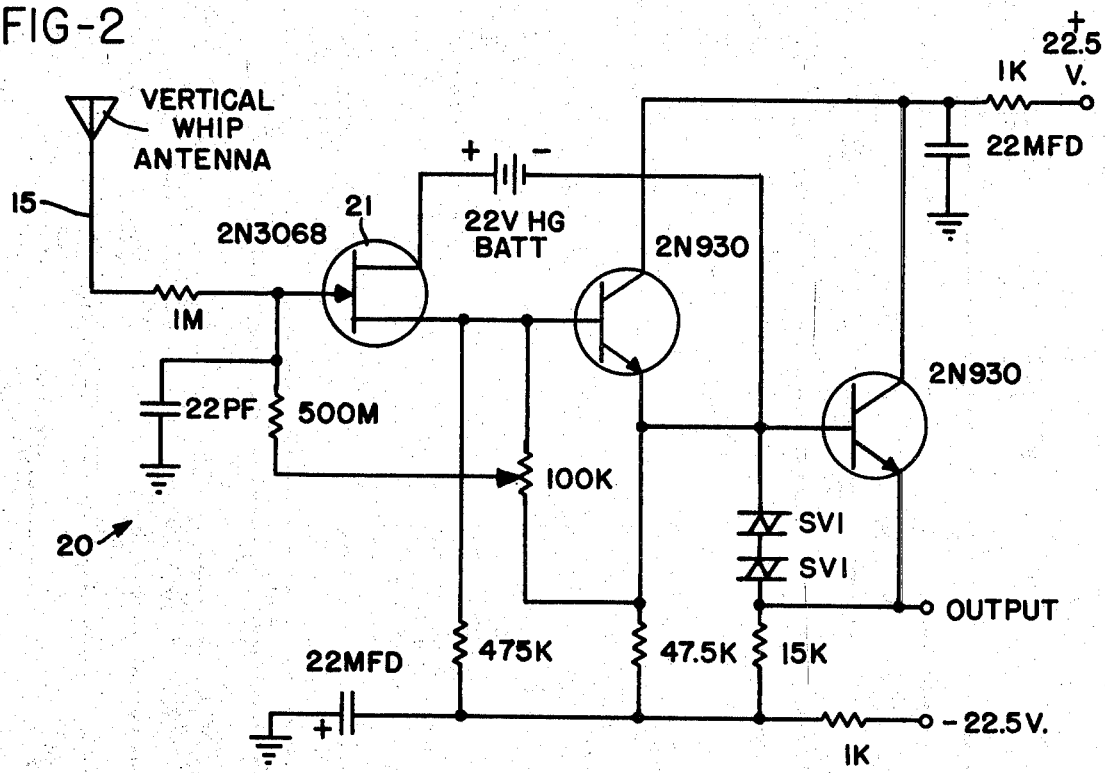
FIG. 2 is an electrical schematic diagram showing a preferred embodiment of the matching circuit for connection with the sensing antenna.

Referring now to FIG. 1, the subject being monitored 10, such as a human being or other living body which exhibits intrinsic electrical activity, is shown situated in close proximity to an antenna 15. As mentioned previously, the living body 10 radiates electric fields due to both the time varying mechanical motion of the body, since the body has a static charge with respect to the earth, and in response to the electrical energy released during the operation of body cells. It has been found that muscle and nerve cells generate a charge during their operation, and in the case of the heart muscle, a large number of charge generators are synchronized to produce the heart beat.

The antenna 15 is positioned in proximity to the body to receive the electric field radiated therefrom having a frequency in the order of from 0 to 3 kHz. The antenna has a physically small length, in the order of from 1 to 6 feet to be practically useful, and therefore is inherently electrically short with respect to the wavelength of the radiation emitted by the body. The antenna may be positioned approximately eighteen inches from the body being monitored, but it has been found that useful signals have been obtained with the antenna placed as far as four feet away.

More than one antenna may be employed to improve the signal to noise ratio, with the antennas being so arranged with respect to the body that the electric signals developed in the antennas resulting from the energy radiated as an electric field reinforce each other when combined.

A matching circuit 20 is physically and electrically connected to the lower end of the antenna 15. The input impedance of the matching circuit is made very high in order to match the impedance of the antenna, and in the preferred embodiment of the invention an input impedance in the order of $10^{10}$ ohms has been found to be adequate. Since the antenna is located adjacent to the body undergoing test and the matching circuit is physically connected thereto, partially to limit the length of the antenna and partially to eliminate the transmission lines which would otherwise be necessary to interconnect the antenna with the matching circuit from lowering the impedance of the input circuit thus diminishing the sensitivity of the antenna to the low frequency radiated electric fields, the matching circuit is preferably made of solid state construction and is preferably battery powered.

The output impedance of the matching circuit 15 has a low value so that relatively long cables can interconnect the matching circuit with the remainder of the equipment without loading the antenna or without picking up stray ambient noise signals. A gain of unity is the nominal operating condition of the matching circuit since any amplification of the received signal would also amplify the ambient noise components. A major portion of the noise results from power line interference, and these ambient noise signals are of such magnitude that they could easily overdrive the following amplifier stages.

The matching circuit 20 therefore converts the electric field energy received by the antenna 15 into electrical signals of a low impedance nature which may be routed to other electrical circuits where the ambient noise components are removed or attenuated.

A detailed schematic diagram of the matching circuit is shown in FIG. 2 and includes a field effect transistor 21 having its gate electrode connected to the antenna 15. The high impedance nature of the antenna is maintained by interconnecting the source electrode and the gate electrode. This raises the effective impedance of the transistor to substantially that of the antenna allowing the matching circuit to have a uniform frequency response from 3 kHz down to at least 0.1 Hz.

The output from the matching circuit 20 is processed to remove the ambient noise components by a device shown generally at 25 in FIG. 1. Several methods of ambient noise removal have been successfully employed. One method includes physically screening the room enclosing the body 10 undergoing test as well as the antenna 15 which receives the electric fields radiated by the body. Another method employs filters to remove electronically the periodic ambient components or those noise signals having a fairly well defined range of frequencies. Another method uses differential antennas wherein the ambient noise is electrically canceled. Obviously, operating in an environment absent any ambient noise components provides the most favorable operating conditions, and consequently it is preferable to use the screened room wherein external ambient electric fields such as from power lines are shunted to ground by the low impedance nature of the screen surrounding the antenna and the body and are therefore prevented from affecting the input to the antenna.

Another approach to the removing of ambient noise which has been successfully employed and which does not require that the ambient noise be of a periodic nature uses two antenna systems which are spatially separated with one antenna being placed in close proximity to the body undergoing test receiving both electric energy radiated by the body and any ambient noise signals which may be present, and the other antenna being separated from the body but within the same ambient noise field to receive only ambient noise signals.

Figure 3:
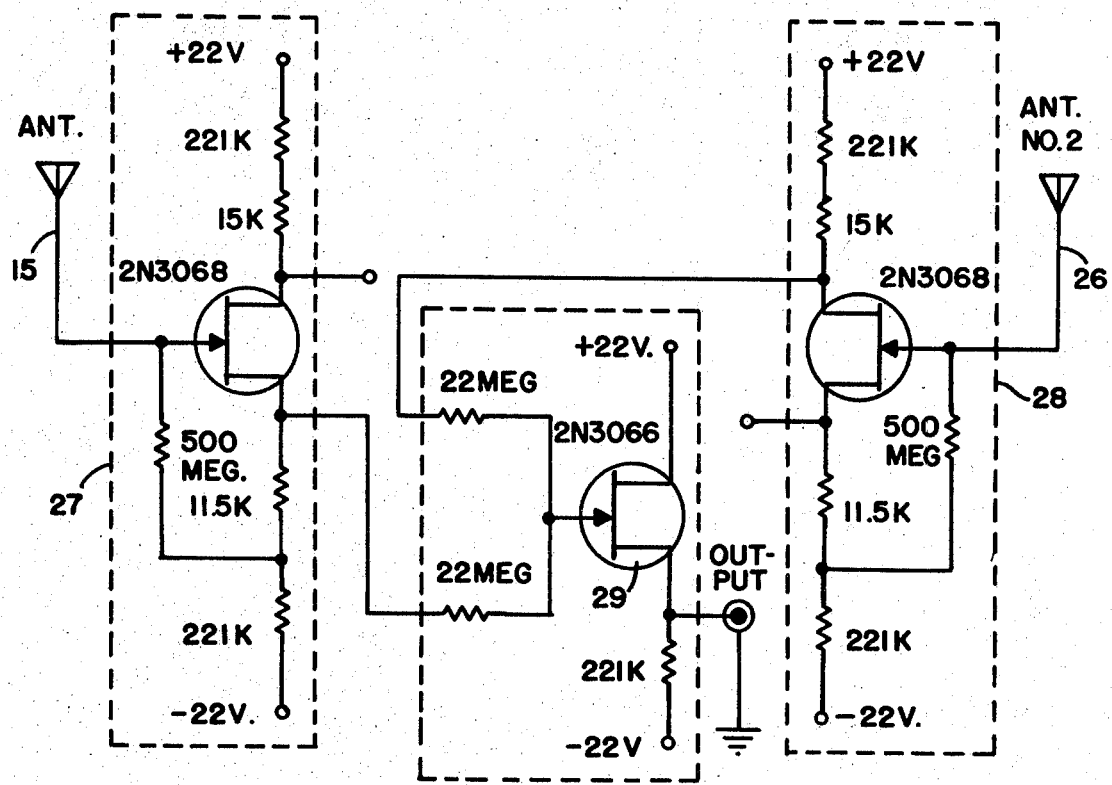
FIG. 3 is an electrical schematic diagram of another embodiment showing a pair of matching circuits for use with differential antennas and a mixing circuit for eliminating ambient noise components from the electrical output signal.

A circuit useful for this purpose is shown in FIG. 3 where antenna 15 is placed near the body undergoing observation and antenna 26 is placed a sufficient distance away from the body to receive only the ambient noise field. Antenna 15 is connected to the gate electrode of field effect transistor in matching circuit 27, and that transistor has its input impedance maintained at a high value in a manner similar to the matching circuit shown in FIG. 2 through the interconnection between the source electrode and the gate electrode. Similarly, antenna 26 is connected to the gate electrode of its associated field effect transistor in matching circuit 28. The output of each of these matching circuits is applied to the gate electrode of field effect transistor in the mixing circuit 29, which also functions as a buffer device to isolate both of the matching circuits and their associated antennas from loading which would otherwise result from the amplfying and processing equipment. The field effect transistor in mixing circuit 29 functions as an electrical adder circuit with its gate electrode electrically connected both to the source electrode of field effect transistor in matching circuit 27 and to the drain electrode of field effect transistor 28. Assuming the ambient noise signal is received equally by the two antennas, the electrical output from the two matching circuits will be electrically 180° out of phase and electrical cancellation of the ambient noise components accomplished. The resultant signal representing only the biological activity of the body 10 is amplified by field effect transistor in the mixing circuit 29.

Figure 4:
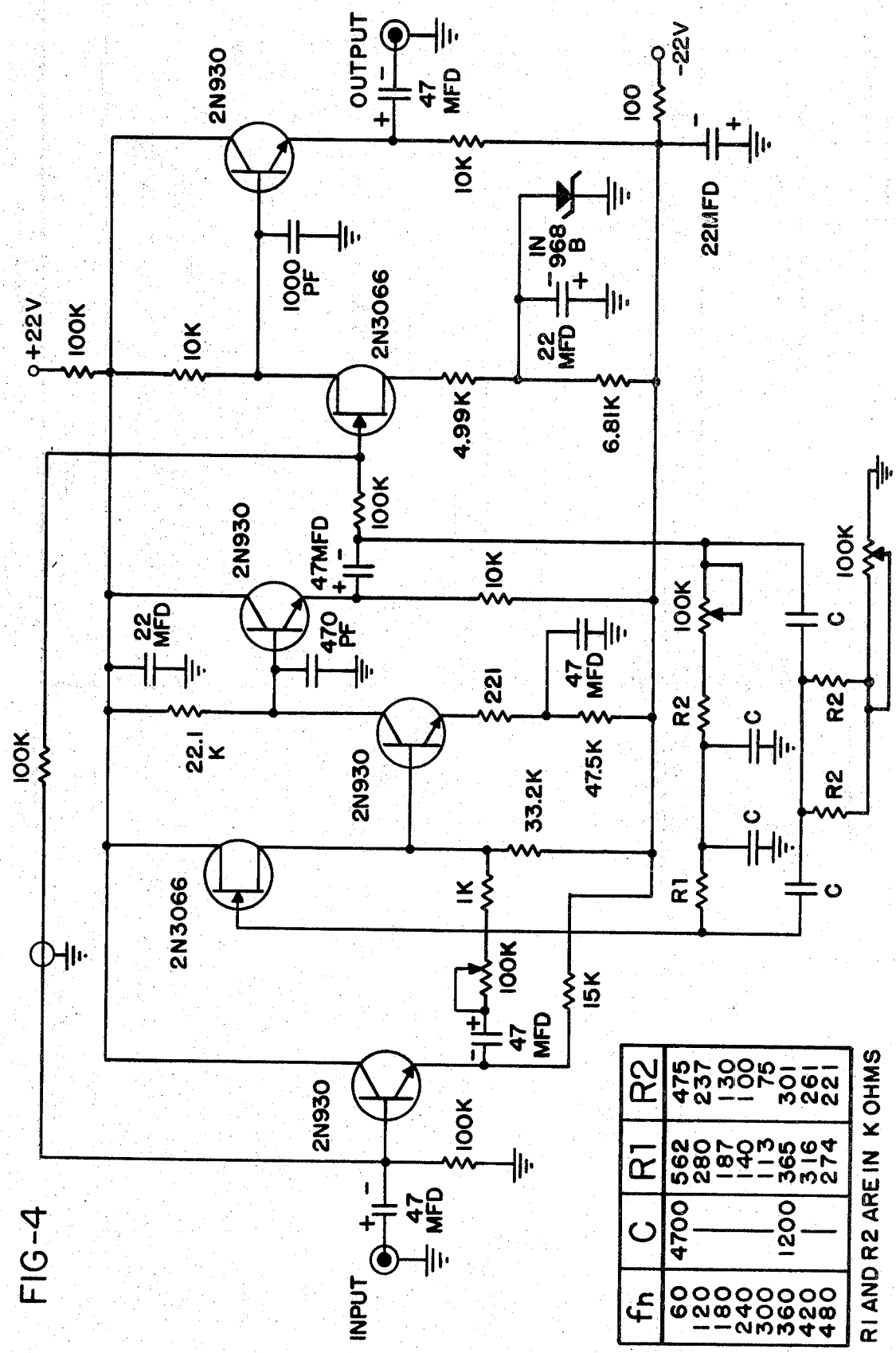
FIG. 4 is an electrical schematic diagram showing a notch filter for eliminating periodic noise components from the input signal.

With respect to filtering systems for rejecting the ambient noise, one approach which has been successfully employed is to use a notch type filter of the type shown in FIG. 4 wherein a fixed tuned R-C active filter circuit is connected between the matching circuit and the remainder of the processing equipment. This circuit will reject one frequency component, either fundamental or harmonic, of the power line interference.

Figure 5:
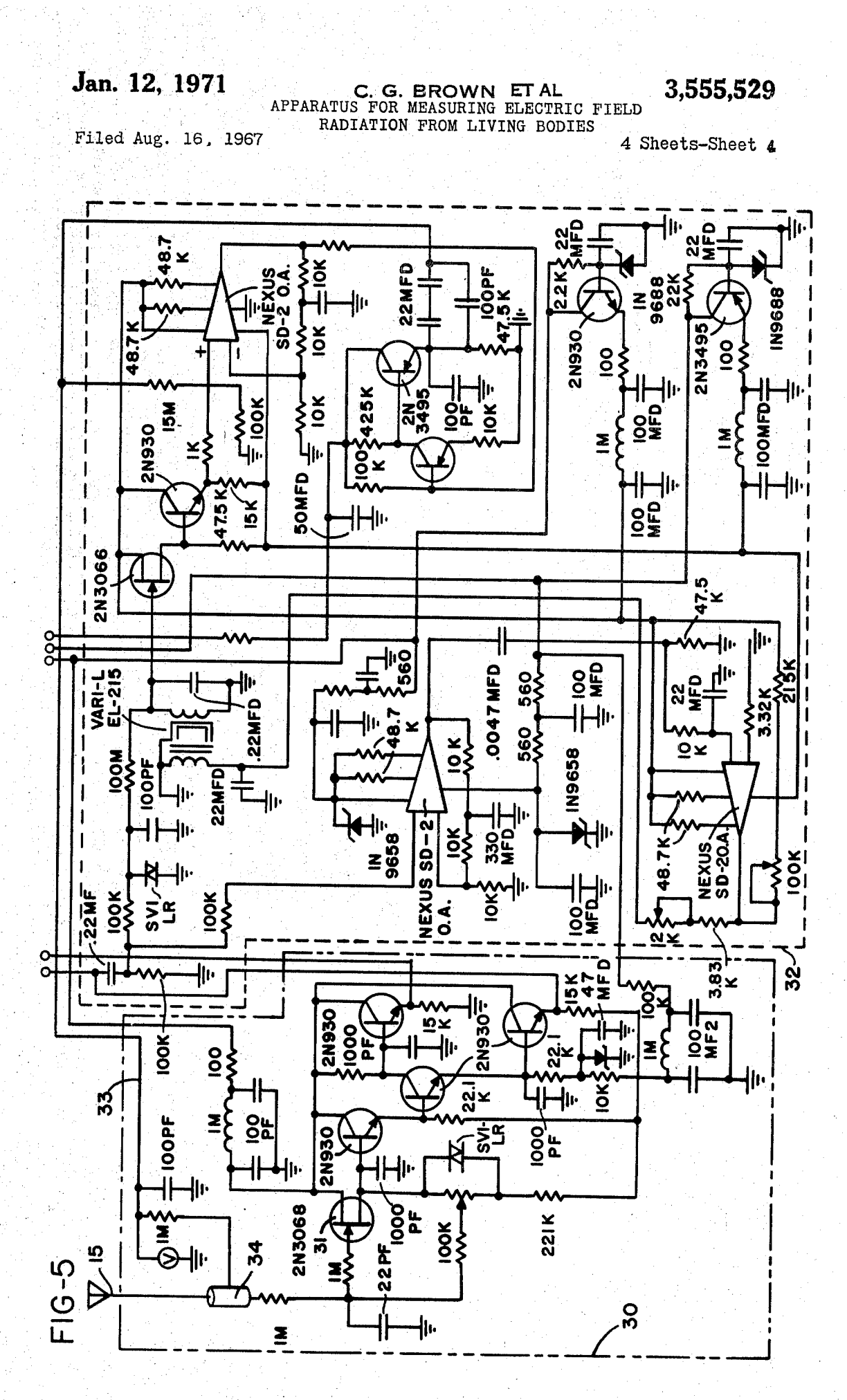

A bucking type power line frequency rejection filter is shown in FIG. 5. The antenna 15 is connected in the usual manner to the gate electrode of the field effect transistor in the matching circuit 30. The matching circuit shown in FIG. 5 is somewhat more complex than the matching circuits shown in either FIGS. 2 or 3, but its operation and function is similar in that the source electrode is interconnected with the gate electrode of field effect transistor 31 in order to raise the input impedance of that device and retain the sensitivity of the antenna 15 to the electric field radiated by the body undergoing observation. The output of the matching circuit 30 is applied to the bucking filter 32 shown within the dotted lines to the right of the matching circuit, where it is then processed. A feedback signal, equal in amplitude and 180° out of phase with the input signal, which represents the predetermined selected frequency to be rejected is applied along line 33 to a capacity coupling device 34 which surrounds the antenna 15 near its connection with the gate electrode of the transistor 31 within the matching circuit 30. Thus, ambient noise falling within the selected frequency range is thereby canceled.

Another type of filter (not shown) is a synchronous harmonic filter which rejects all fundamental frequencies as well as all harmonics of the power line interference. Such circuits are well known to those skilled in the art and automatically lock onto and, within limits, follow any changes in the frequency of the interference signal. Filter circuits of above mentioned types require that the ambient noise components have a periodic nature, that is a rather definite frequency or set of frequencies which can be selectively eliminated from the incoming signal. The filtering systems for ambient noise removal thus described may be used in conjunction with both the screened room and the differential antenna type noise removal devices.

After the ambient noise components have been rejected from the electrical signal supplied by the matching circuit, the signals are then amplified by amplifier means 35, processed by the circuit shown generally at 40, and visually presented on the display device 45. The signals are then analyzed to determine what the detected radiated electric field means in terms of the functions within the living body. Since the frequency of the radiation emitted by the body is extremely low, in the order of 0 to 3 kHz., amplifiers with good low frequency response and low noise signals are used. The means 35 for amplifying the electrical signals are of conventional design and therefore are not described in detail in this application. Since the amplifiers are sensitive, that is they have a high gain, the ambient noise components must be removed or eliminated prior to any significant amplification to prevent overdriving these components.

From the amplifiers 35, the signals are then processed by circuits shown generally at 40. Signal processing has been accomplished both by the frequency domain technique or by the time domain technique. Frequency domain processing may be accomplished through spectrum analysis using a bank of narrow bandpass filters, each filter circuit passing only in a limited range of frequency. Thus, a plurality of outputs would be provided, each responsive only to a limited frequency range. Time domain processing is accomplished by correlation of base line data, which may in some cases be derived from an electrode attached to the body with the electric field signal detected by the apparatus described above. After extracting the key data parameters, a physiological or psychological interpretation of the data is then accomplished by observation of the displty device shown generally at 45.

It is noted that the circuits used for signal amplification and processing, as well as the equipment used for the display of the process signals are not new in themselves and therefore a detailed description of these components is not given here. In one embodiment, a PAR Model CR-4 amplifier was used for signal amplification and processing, with the processing operation being accomplished by varying the amplifier frequency cutoff points. Obviously, other devices and techniques may be employed for this purpose.

Reference is now made to FIGS. 6a and 6b, each of which shows typical traces of the heart beat of a human subject. In FIG. 6a the heart beat trace 50 is the primary signal observed, the amplitude of this signal being in the order of two millivolts. The subject being monitored held his breath during this experiment in order to provide a clear illustration of the heart signal which was radiated from this body as an electric field. However, with a normally breathing subject, the subject's respiration pattern would be superimposed on the heart signal and would appear as a low frequency modulation of the signal shown in FIG. 6a. FIG. 6b is a chart, made at the same time as the chart of FIG. 6a, showing the heart beat trace 52 as detected by the standard EKG method. The heart beat here appears as a signal of 0.15 to 0.2 millivolt amplitude. A phase difference may be noted between the signal observed by the apparatus of this invention and shown in FIG. 6a and that signal observed by the EKG method and shown in FIG. 6b, although it will be apparent to those skilled in the art that trace 50 may be interpreted for diagnostic purposes as easily as trace 52.

Other biological activities within the body may be displayed using the proper techniques, such as frequency or time domain processing as mentioned above.

Therefore, an apparatus has been described for monitoring the radiated electric field generated due to the biological activity of a living body, such activity being due both to the release of electrical energy within the muscles and nerves of the body and due to the physical movement of a body which possesses a static charge with respect to ground.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. Apparatus for remotely measuring the biological activity of a living body by monitoring an electric field radiated by said body having a frequency in the range of from 0 to 3 kHz., comprising a high impedance antenna system electrically short in relation to the wavelength of the electric field radiated by the living body;

means for mounting said antenna system adjacent the living body to receive radiation therefrom;

matching circuit means for converting the electric field received by said antenna system into electrical signals, said matching circuit being physically and electrically connected to said antenna system and having an input impedance substantially matching the impedance of said antenna system at the point of connection to define the physical length of said antenna, to reduce the pickup of unwanted ambient noise by the interconnection between the antenna and the matching circuit, and to maintain the sensitivity of the antenna system to the radiated electric field by maintaining its impedance at a high value;

means for removing ambient noise components from said electrical signals;

means for amplifying the electrical signals after the ambient noise components have been removed; and means for processing the electrical signals representing the electric field radiated by the living body in the frequency range of from 0 to 3 kHz. to produce analogue signals related to the activity of said living body.

2. The apparatus of claim 1 wherein said matching circuit includes a field effect transistor having the gate electrode thereof connected to said high impedance antenna system, and means to raise the effective input impedance of said field effect transistor to substantially that of said antenna system allowing the matching circuit to have a uniform frequency response from 3 kHz. down to at least 0.1 Hz., said means including an interconnection between the source electrode and the gate electrode of said field transistor.

3. The apparatus of claim 1 wherein said means for removing ambient noise components includes a second high impedance antenna system, also electrically short in relation to the wavelength of the radiated electric field;

means for mounting said second antenna system within the ambient noise field but spaced apart from said living body to cause said second antenna system to receive the same ambient noise radiation as received by the other said antenna system;

second matching circuit means for converting the electric field received by said second antenna system into electrical signals; and means for electrically subtracting the signals received by said second antenna system from those signals recevied by the other said antenna system to give a resultant signal which represents only the electric field radiated by said monitored living body.

4. The apparatus of claim 1 wherein said means for removing ambient noise components includes filter means having a rejection frequency equal to the frequency of unwanted noise components connected between said matching circuit means and said amplifying means.

5. The apparatus of claim 1 wherein said means for removing ambient noise components includes electrostatic screen means positioned around said living body and said antenna system for isolating them from ambient noise electric energy.

References Cited

UNITED STATES PATENTS

| | | | |
|---|---|---|---|
| 2,415,810 | 2/1947 | Cohen | 325—371X |
| 2,617,927 | 11/1952 | Cohen | 325—371 |
| 2,897,353 | 7/1959 | Schweiss | 325—381X |

OTHER REFERENCES

Goldberg; Synchronized Voltages For Bioelectric Research, Electronics, August 1941, pp. 30–32 and 82.

THOMAS B. HABECKER, Primary Examiner

U.S. Cl. X.R.

128—2.1; 325—67, 381